(No Model.)

F. G. WHITNEY.
ORNAMENTAL CHAIN.

No. 245,594.          Patented Aug. 9, 1881.

Attest:
R. F. Barnes.
F. L. Middleton.

Inventor:
Felix G. Whitney
By Ellis Spear
Attorney

United States Patent Office.

FELIX G. WHITNEY, OF ATTLEBOROUGH, MASSACHUSETTS.

ORNAMENTAL CHAIN.

SPECIFICATION forming part of Letters Patent No. 245,594, dated August 9, 1881.

Application filed June 3, 1881. (No model.)

*To all whom it may concern:*

Be it known that I, FELIX G. WHITNEY, of Attleborough, in the county of Bristol and State of Massachusetts, have invented a new and useful Improvement in Ornamental Chains; and I do hereby declare that the following is a full, clear, and exact description of the same.

My invention relates to an improvement in ornamental chains of that class wherein a ball is held between the opposite sides of the separate links, each link containing one of such balls, the balls and links being usually made of metals of different color.

Heretofore in the manufacture of this class of chain the custom has been to form each link from two pieces of metal having the ends soldered together, and having the ornamental ball secured between the pieces forming the link by soldering. By this construction considerable labor and expense were required in finishing the link after the ball had been soldered in position, and it was, in such cases, impossible to remove all traces of the solder—an objectionable feature which prevented such chains from coming largely into use.

My invention consists in forming the chain-links preferably of one piece of metal bent into the required shape, and securing the ornamental ball in position by compression, without the use of solder; and this invention is illustrated in the accompanying drawings, in which—

Figure 1:
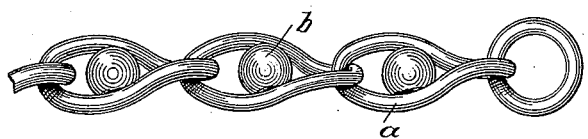
Figure 2:

Figure 1 is a side view of the chain; Fig. 2, a separate view of one of the ornamental balls, and Fig. 3 a separate view of the link.

The links *a a* of the chain are each constructed preferably of a single piece of metal, either gold, silver, or base metal, bent into the shape desired to form a complete link. If preferred, each link may be formed of two pieces soldered together at the ends.

*b* represents the ball of metal, which may be hollow or solid, as desired, and which is provided at its opposite poles with a groove, depression, or recess, 1. The ball may be composed of the same metal as the link; but the effect is heightened by using a metal of different color to form a contrast.

Figure 3:

As ordinarily constructed the link is bent into the shape illustrated in Fig. 3, its sides being curved in opposite directions, as shown, and the effect of this peculiar form is to hold the ball by lateral pressure. When the link is bent into this shape, therefore, the grooves or recesses 1 1 on the opposite poles of the ball run in the same direction as the sides of the link which they are to fit. When the link is composed of one piece of metal the ball is placed between the opposite sides before the free ends are soldered, and such sides are pressed together forcibly, causing them to enter the grooves in the ball and hold them firmly.

From the peculiar shape of the link it is evident that the ball can have no movement in any direction, since the link is prevented from moving in one recess by the incline on the opposite side of such link. As thus constructed no solder is necessary except to secure the free ends of the link, and this adds materially, not only to the appearance of the article, but to the cheapness with which it can be produced.

Having thus described my invention, what I claim is—

1. The combination, with a chain-link, of a ball having grooves 1 1, substantially as and for the purposes set forth.

2. The combination, with a chain-link, the sides of which are bent into opposite directions, as shown, of an ornamental ball adapted to be secured within such sides by compression, and having grooves corresponding to the direction of the sides which they are to fit.

In testimony whereof I have signed my name to this specification in the presence of two subscribing witnesses.

FELIX G. WHITNEY.

Witnesses:
   J. E. POND, Jr.,
   G. K. WEBSTER.